United States Patent

Dunlap et al.

[11] Patent Number: 5,913,923
[45] Date of Patent: Jun. 22, 1999

[54] MULTIPLE BUS MASTER COMPUTER SYSTEM EMPLOYING A SHARED ADDRESS TRANSLATION UNIT

[75] Inventors: Frederick S. Dunlap, Longmont, Colo.; Anil K. Patel, Kentfield, Calif.

[73] Assignee: National Semiconductor Corporation, Santa Clara, Calif.

[21] Appl. No.: 08/761,586

[22] Filed: Dec. 6, 1996

[51] Int. Cl.$^6$ .............................. G06F 13/00; G06F 12/00
[52] U.S. Cl. ............................ 710/100; 710/65; 711/200; 711/202; 711/203; 711/206; 711/207; 711/3
[58] Field of Search ...................... 711/200, 202, 711/203, 206, 207, 3; 395/403, 885; 710/65

[56] References Cited

U.S. PATENT DOCUMENTS

| | | | |
|---|---|---|---|
| 4,481,573 | 11/1984 | Fukunaga et al. | 711/207 |
| 4,956,805 | 9/1990 | Biffle et al. | 395/885 |
| 5,313,583 | 5/1994 | Yokota et al. | 345/10 |
| 5,438,670 | 8/1995 | Baror et al. | 395/403 |
| 5,488,688 | 1/1996 | Gonzales et al. | 395/183.1 |
| 5,630,087 | 5/1997 | Talluri et al. | 711/202 |

*Primary Examiner*—Ayaz R. Sheikh
*Assistant Examiner*—Frantz Blanchard Jean
*Attorney, Agent, or Firm*—John L. Maxin

[57] ABSTRACT

A multiple bus master computer system employs an interface to a central processor allowing external bus masters to query the central processor with addresses and to receive back translated addresses. A first preferred embodiment employs two signals namely: translation request and translation address strobe to request/acknowledge the request for translation. The translation request is maintained asserted by one of the alternative bus masters until the central processor acknowledges it—at which time the alternative bus master drives an address (for example a virtual address) onto the address bus for translation. The central processor then translates the virtual address to its corresponding physical address (doing any page table walking or page faulting) and drives this physical address out on the address lines and asserts another translation address strobe. If a page fault occurs, the central processor communicates to the alternative bus master to release the translation request until the central processor performs a table walk. After page fault recovery, the central processor communicates to the alternative bus master to reassert the translation request so that the translation may be completed. Alternative embodiments employ new encoding of preexisting signals to signal requests/acknowledgments for translation.

20 Claims, 5 Drawing Sheets

MULTIPLE BUS MASTER COMPUTER SYSTEM EMPLOYING A SHARED ADDRESS TRANSLATION UNIT

BACKGROUND OF THE INVENTION

1. Field of the Invention

The invention relates generally to address translation, and more specifically to a computer system employing multiple bus masters which share a common address translation unit and paging mechanism.

2. Description of Related Art

The following background information and definitions are provided as a basic level set for understanding the underlying principles for application of the present invention and is not meant to limit the present invention to any of the specific examples set forth herein.

An "operating system" is an underlying supervisory program which runs on a computer system, typically transparent to the user, for handling routine tasks such as memory management.

A "page" is a minimum size block of information in a virtual memory system which is swapped between primary memory (e.g. RAM) and a secondary memory (e.g. disk drive), typically under the control of the operating system.

An "exception" is an abnormal or uncommon event occurring in the computer system intended to signal it to perform a task, typically to service the exception.

A "page fault" is a particular type of exception which is generated when a requested virtual address is not in primary memory.

A "translation lookaside buffer" (TLB) is a particular type of cache that stores physical addresses of the most recently used pages.

"Thrashing" is an undesirable event that occurs when a page is frequently swapped between primary and secondary memories.

So-called virtual memory addressing is a well known technique whereby large address spaces are emulated with relatively small, but fast memory (such as RAM) and relatively large, but relatively slow secondary memory (such as a disk drive). Historically, virtual memory addressing was performed because fast memory was far too cost prohibitive to support large address spaces. The most common way of implementing virtual memory addressing in a computer system is by swapping minimum sized blocks of information known as pages into and out of RAM from a disk drive under the control of the operating system when a requested address is not located within the primary or physical memory.

The requested address (referred to as the "virtual", "linear", or "logical" address) is either translated to a corresponding physical address in RAM or causes an exception to be generated known as a so-called page fault if the required address falls in a memory location defined by a page not currently in RAM. When the operating system services the page fault, typically some form of "least recently used" (LRU) technique is used to expunge that page from RAM, load the required page, and restart the address request. In the x86 architecture, the page size is typically, although not necessarily, fixed at four kilobytes and aligned on four kilobyte boundaries.

Referring now to FIG. 1, a two-level page table addressing technique is described in the context of the x86 architecture. Bits 31–22 of a thirty-two bit linear address are used to locate an entry in a so-called directory table 10. The directory table 10 is a master index for up to one thousand twenty four individual second-level page tables. The selected entry in the directory table 10, referred to as the directory table entry (DTE), identifies the starting or "base" address 11 of a second-level page table 12. The directory table 10 is typically four kilobytes in size, holding one thousand twenty four—four-byte DTEs, and is itself a page and therefore aligned to a four kilobyte boundary. Each DTE has twenty bits which define the page table (base) address and twelve bits which define attributes, some of which are unused, described in more detail hereinbelow. The base address 13 of the directory table 10 is stored in a page directory base register (PDBR) 14.

Bits 21–12 of the thirty-two bit linear address offset the base address 11, to locate a thirty-two bit entry, referred to as the page table entry (PTE), in the second-level page table 12. The page table 12 addresses up to one thousand twenty four individual page frames and is four kilobytes in size, holding one thousand twenty four—four-byte PTEs, and is itself a page aligned to a four kilobyte boundary. Each PTE has twenty bits which define a desired page frame within physical memory (RAM) 16 and twelve bits which define attributes, some of which are unused, described in more detail hereinbelow.

Bits 11–0 of the thirty-two bit linear address, referred to as the page. offset, locate the desired physical memory address within the page frame 15 pointed to by the PTE. Since the directory table 10 can point to one thousand twenty four page tables, and each page table can point to one thousand twenty four of page frames, a total of 1,048,576 page frames are realized. Since each page frame 15 contains four kilobytes of physical memory addresses (a page offset of twelve bits), up to four gigabytes of virtual memory can be addressed. The directory table 10 and page table 12 may reside wholly or in part, in cache or external memory.

Reference is now made to FIG. 2 which illustrates in more detail, the DTE and PTE of FIG. 1. Each DTE and PTE contains a twenty bit base address (bits 31–12) of either the page table 12 or the page frame 15 respectively, as well as twelve other attribute bits (bits 11–0). A present bit (P) (bit 0) is set in the DTE to indicate that the requested page table 12 is present and therefore the appropriate PTE can be read. The P bit is also set in the corresponding PTE to indicate that the page is in physical memory 16. Accessed (A) and dirty (D) bits, bits 5 and 6 respectively, are updated upon a hit, if necessary, and the information is fetched from physical memory 16. Accessed (A) bits in both the DTE and the PTE are set, if necessary, to indicate that the directory table 10 and page table 12 have been used to translate a linear address. The dirty (D) bit in the DTE and PTE are set before the first write is made to a page. Both present bits are set to validate the remaining bits in the DTE and PTE. If either of the present bits are not set, a page fault is generated when either the DTE or PTE is accessed. If the P bit is not set, the remaining DTE/PTE bits are available for use by the operating system, for example, to record the address on the hard disk where the page is located. A page fault is also generated if the memory reference violates the page protection attributes set in bits 1–4. The details of these attribute bits are not necessary for the understanding of the present invention but are mentioned for completeness. A more complete explanation can be found in the CX486DX/DX2 data book, order number 94113-01, from Cyrix Corporation, Richardson, Tex., herein incorporated by reference.

The two-level table access described above is sometimes referred to as "tablewalking". Tablewalking is time intensive because for a two level page table, it requires at least three memory cycles namely; one for fetching the DTE, one for fetching the PTE, and one for reading or writing the requested address in physical memory 16. Frequently, this access latency can be avoided with the use of a translation lookaside buffer (TLB) 18. The TLB 18 contains "tags" (i.e. copies of the most recently accessed linear addresses) along with their corresponding physical addresses. The TLB 18 replaces tablewalking, thus reduces memory cycles, when a desired linear address matches "hits" with one of the tags stored within it. Accordingly, the TLB 18 can immediately map the linear address to the physical address without doing a tablewalk.

By way of further background, in a multiple bus master computer system, physical memory 16 may be accessed by devices other than the processor, including DMA devices, micro-controllers, as well as by other processors (e.g. symmetric multiprocessing). In the x86 architecture, signals $\overline{\text{BOFF}}$, HOLD, and HLDA, described in the CX486DX/DX2 data book, order number 94113-01, from Cyrix Corporation, Richardson, Tex., which was herein incorporated by reference, provide an adequate protocol for bus arbitration for current x86 architectures but do not address virtual to physical memory translation.

Specifically, $\overline{\text{BOFF}}$ (back-off) is asserted by system (chipset) logic to force the processor to abort a current bus cycle, and relinquish control of the local processor bus in the next clock cycle. Once $\overline{\text{BOFF}}$ is de-asserted, the processor restarts any aborted bus cycle in its entirety. HOLD (bus hold request) is slightly different from $\overline{\text{BOFF}}$ and is asserted by chipset logic to indicate that a DMA device requests control of the local processor bus to run a DMA access to memory. Unlike $\overline{\text{BOFF}}$, the processor completes the current bus cycle and then acknowledges the request and relinquishes control of the local processor bus. HLDA (hold acknowledge) is asserted by the processor in response to HOLD (after the current bus cycle is completed) indicating that it has relinquished control of the local bus for a DMA access. When chipset logic de-asserts HOLD, the processor de-asserts HLDA.

In addition to the above mentioned bus arbitration signals, current x86 architecture computer systems use cache coherency signals AHOLD and $\overline{\text{EADS}}$ to support caching on the processor. AHOLD (address hold request) is asserted by chipset logic to cause the processor to tri-state the address lines of the local bus one clock after AHOLD while still completing the current bus cycle. A DMA device performs a cache inquiry cycle by driving an address into the processor at the same time it is presented to memory. The processor does not initiate another bus cycle except for a snoop write-back cycle resulting from the cache inquiry.

It is contemplated that sophisticated bus master devices will be added onto the local processor bus which will require address translation such as, but not limited to, virtual to physical address translation. An exemplary but not exhaustive example of this is a rendering processor that performs draws, fills, and bitblt operations to main memory (as well as to its local video memory) or shared memory—thus requiring virtual to physical address translation. In this regard, up until now address translation was accomplished locally for each bus master—requiring a separate address translation unit or software routine for each bus master.

By way of further background, high speed, dedicated graphics ports are emerging that support memory bandwidth intensive applications such as 3D rendering. An exemplary, but not exclusive scheme for this can be found in the *Accelerated Graphics Port Interface Specification*, Revision 1.0, dated Jul. 31,1996, from Intel Corporation of Santa Clara, Calif., said specification herein incorporated by reference. In this scheme, a graphics accelerator is coupled through a dedicated accelerated graphics port (a.k.a. AGP) to chipset logic which, among other things, arbitrates accesses to system memory. Additionally, the AGP scheme requires the chipset logic to include a so-alled Graphics Address Re-mapping Table (a.k.a. GART) mechanism separate and distinct from the virtual to physical address translation mechanism, so that the graphics accelerator perceives a contiguous view (memory address-wise) of graphics data structures in dynamically allocated system memory.

Ostensibly, the disadvantage of using multiple address translation units (including a GART in the chipset logic) is redundancy of hardware along with its attendant space consuming and power consumption issues, as well as the additional burden on the operating system to initialize and maintain coherency among multiple address translation units.

Accordingly, it can be seen from the foregoing, that there is a need to provide a shared address translation unit for use in a multiple bus master computer system, thus reducing size, cost, and complexity.

SUMMARY OF THE INVENTION

To overcome the limitations of the prior art described above, and to overcome other limitations that will become apparent upon reading and understanding the present specification, the present invention discloses a multiple bus master computing system that employs an interface to a central processor—allowing other bus masters to query the processor with (virtual) addresses and to receive back translated (physical) addresses.

If only one other alternative bus master is present, a first preferred embodiment uses two new signals to the x86 architecture, one input and one output, namely: translation request ($\overline{\text{TREQ}}$) and translation address strobe ($\overline{\text{TADS}}$). ($\overline{\text{TREQ}}$) is an input to the central processor asking it to read the address lines. $\overline{\text{TADS}}$ is a strobe asserted by the central processor to the alternative bus master acknowledging the request and identifying that the central processor is reading the address lines. More specifically, the alternative bus master maintains assertion of $\overline{\text{TREQ}}$ until the processor asserts $\overline{\text{TADS}}$. The alternative bus master, responsive to $\overline{\text{TADS}}$, then drives a (virtual) address onto the address bus that is to be translated to a (physical) address. The central processor then translates the virtual address to its corresponding physical address (doing any page table walking or page faulting) and drives this physical address out on the address lines and asserts another $\overline{\text{TADS}}$.

If a page fault occurs, the central processor communicates to the alternative bus master to release its assertion of $\overline{\text{TREQ}}$ until the central processor performs a page fault recovery. After page fault recovery, the central processor communicates to the alternative bus master to reassert $\overline{\text{TREQ}}$ so that the translation may be completed.

Alternative embodiments employ the AHOLD input signal, a translation request signal (TREQ), or a new encoding of preexisting signals to the central processor, to supply the central processor with addresses and to reply with a special bus cycle to give back the physical address. The central processor may further encode conventional control pins to signal a hit or a page fault and include a bit in a control register to indicate that the page fault was due to an external translation request.

A feature of the present invention is maintaining a computer system with multiple bus masters without redundant address translation units.

Another feature of the present invention is a shared, unitary address translation unit in a multiple bus master computer system, thus eliminating the attendant space and power consumption issues with multiple address translation units.

Another feature of the present invention is elimination of additional burden on the operating system to initialize and maintain coherency among multiple address translation units.

Another feature of the present invention is that address translation is faster by sharing a TLB than alternatively performing a individual software translations with alternative bus masters.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a computer system employing multiple bus masters which share a common address translation unit and paging mechanism, in accordance with the principles of the present invention.

DESCRIPTION OF THE PREFERRED EMBODIMENTS

Figures 1, 2:
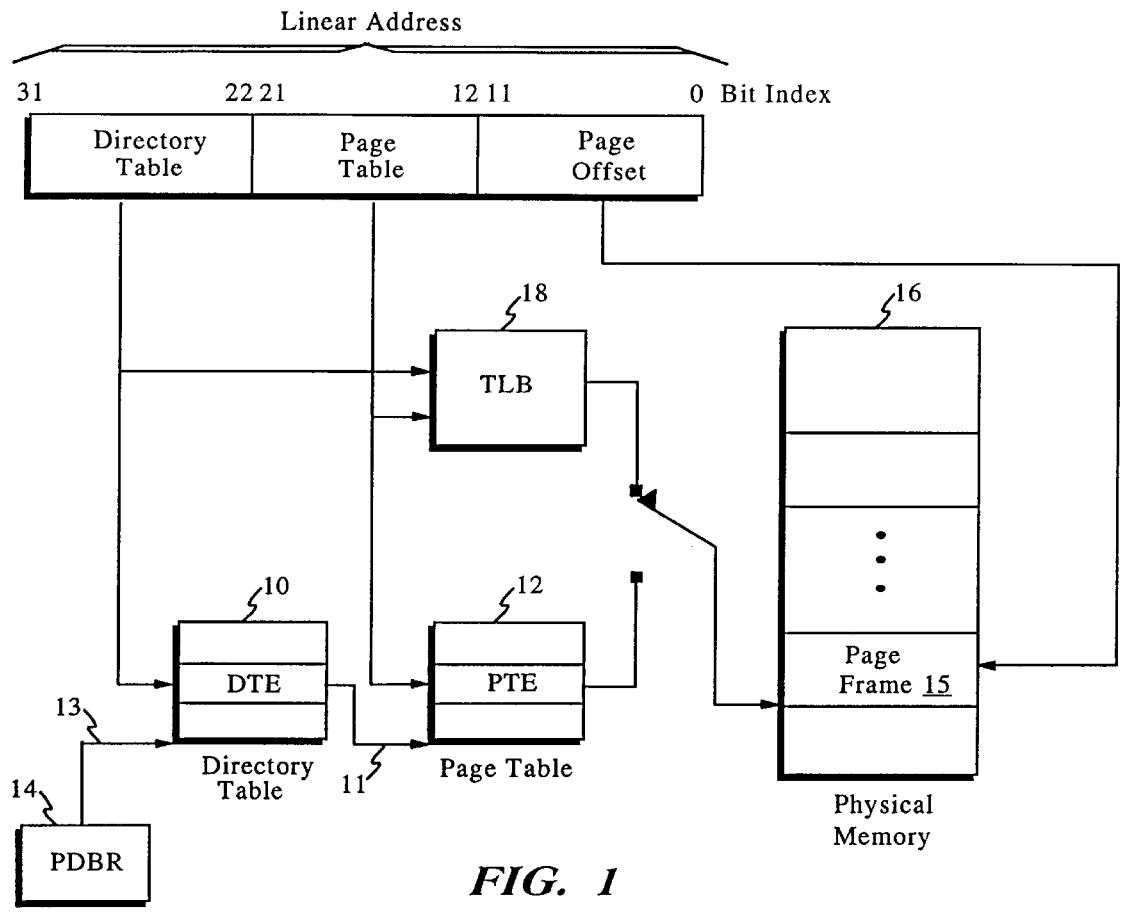
FIG. 1 is a block diagram depicting a prior art two-level table paging scheme.
FIG. 2 is a block diagram depicting the DTE and PTE of FIG. 1 in more detail.

The detailed description of the preferred embodiments for the present invention is organized as follows:
1.0 Exemplary System Employing A Shared Address Translation Unit
2.0 Exemplary Processor
3.0 First Preferred Embodiment For A Shared ATU Interface
3.1 Hit In The Address Translation Unit
3.2 Tablewalk For Address Translation
3.3 Page Fault For Address Translation
4.0 Alternative Embodiments
5. Conclusion This organizational table, and the corresponding headings used in this detailed description, are provided for the convenience of reference only and are not intended to limit the scope of the present invention.

It is to be understood that while the preferred embodiment is described hereinbelow with respect to the x86 architecture, it has general applicability to any computer architecture. Certain terminology related to the x86 computer architecture (such as register names, signal nomenclature, etc.) which are known to practitioners in the field of microprocessor design, are not discussed in detail in order not to obscure the disclosure. It is also to be understood that while the preferred embodiment is described with respect to virtual to physical address translation, it also has application as a re-mapping table mechanism so that a graphics accelerator bus master perceives a contiguous view (memory address-wise) of graphics data structures in dynamically allocated system memory.

Reference is now made to the accompanying drawings which form a part hereof, and in which is shown by way of illustration specific embodiments in which the invention may be practiced. It is to be understood that other embodiments may be utilized and structural changes may be made without departing from the scope of the present invention.

In order not to obscure the disclosure with structural details which will be readily apparent to those skilled in the art having the benefit of the description herein, the structure, control, and arrangement of conventional circuits have been illustrated in the drawings by readily understandable block representations and timing diagrams, showing and describing details that are pertinent to the present invention. Thus, the block diagram illustrations in the figures do not necessarily represent the physical arrangement of the exemplary system, but are primarily intended to illustrate the major structural components in a convenient functional grouping, wherein the present invention may be more readily understood.

1.0 Exemplary System Employing A Shared Address Translation Unit

Figure 3:
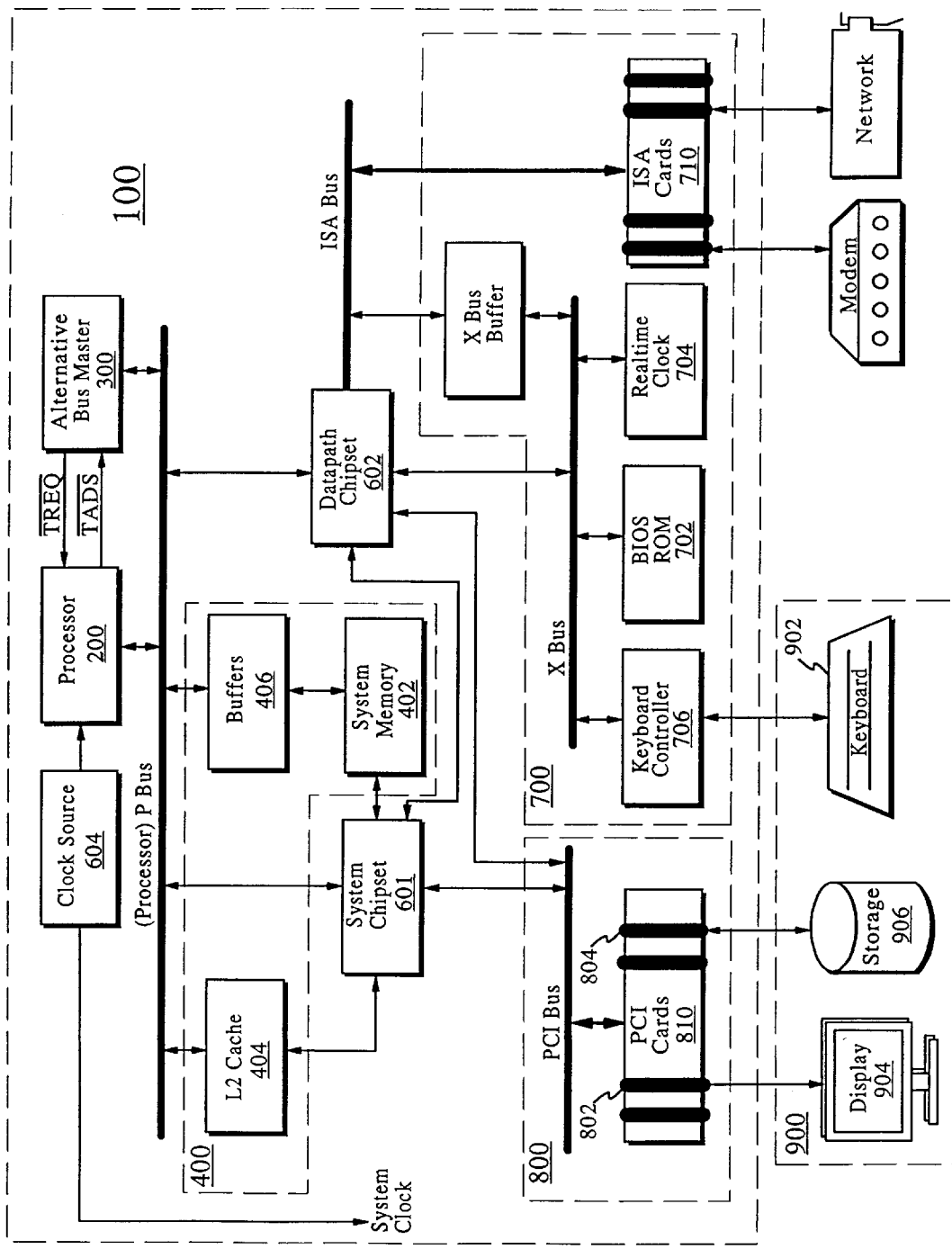
FIG. 3 is an exemplary, but not exclusive, block diagram of a system practiced in accordance with the principles of the present invention.

FIG. 3 illustrates an exemplary computer system, including a system circuit board (a.k.a. motherboard) 100 and various peripherals and peripheral interfaces. A processor 200, alternative bus master 300, and memory subsystem 400 are disposed on the motherboard 100 and are interconnected over a processor P Bus (sometimes referred to as a CPU or local bus). System logic interfaces the processor 200 to three conventional peripheral buses: X bus, PCI bus, and ISA bus. System logic includes a system chipset 601 and a datapath chipset 602, as well as an external clock source 604 (which provides an input clock to the processor 200 and a system clock to the remaining portions of the motherboard 100).

The processor 200, the alternative bus master 300, and the memory subsystem 400 reside on the P Bus—the only other direct connections to the P Bus are the system and datapath chipsets 601 and 602, respectively. According to the exemplary division of system logic functions, the system chipset 601 interfaces to a conventional 32-bit PCI peripheral bus, while the datapath chipset 602 interfaces to the 16-bit ISA peripheral bus and the internal 8-bit X bus. Alternative systems allow for a special VL-bus direct interface to the P Bus for video/graphics and other peripherals.

For 32-bit systems with a 32 bit P Bus, some current system logic designs combine the system and datapath chipset functions into a single chipset. For 64-bit systems with a 64-bit P Bus, the pin count required by the 64-bit data bus width currently necessitates that the system and datapath chipset functions be split as indicated in FIG. 3.

Processor 200 is coupled over the P Bus to system memory (DRAM) 402 and L2 (level 2) cache 404—data buffers 406 control P Bus loading by the system DRAM 402. The system chipset 602 includes P Bus, DRAM, and L2 cache control.

The datapath chipset 602 interfaces to the conventional X bus which is an internal 8-bit bus that couples to the BIOS ROM 702, the RTC (real time clock) 704, and a conventional 8-bit keyboard controller 706.

The system and datapath chipsets 601 and 602 provide interface control for the 16-bit ISA bus and the 32-bit PCI bus. The ISA bus maintains compatibility with industry standard peripherals, coupling to ISA peripheral card slots 710. The PCI bus provides a higher performance peripheral interface for selected peripherals, including coupling to PCI peripheral card slots 810—in particular, a video/graphics card 802 provides a video/graphics interface, while a storage controller 804 (which may be included as part of the system chipset) interfaces to storage peripherals.

The motherboard 100, through the PCI, ISA, and X buses, couples external peripherals 900, such as keyboard 902, display 904, and mass storage 906. Network and modem interconnections are provided as ISA cards, but it is to be understood that they could be also provided as PCI cards.

2.0 Exemplary Processor

Figure 4:
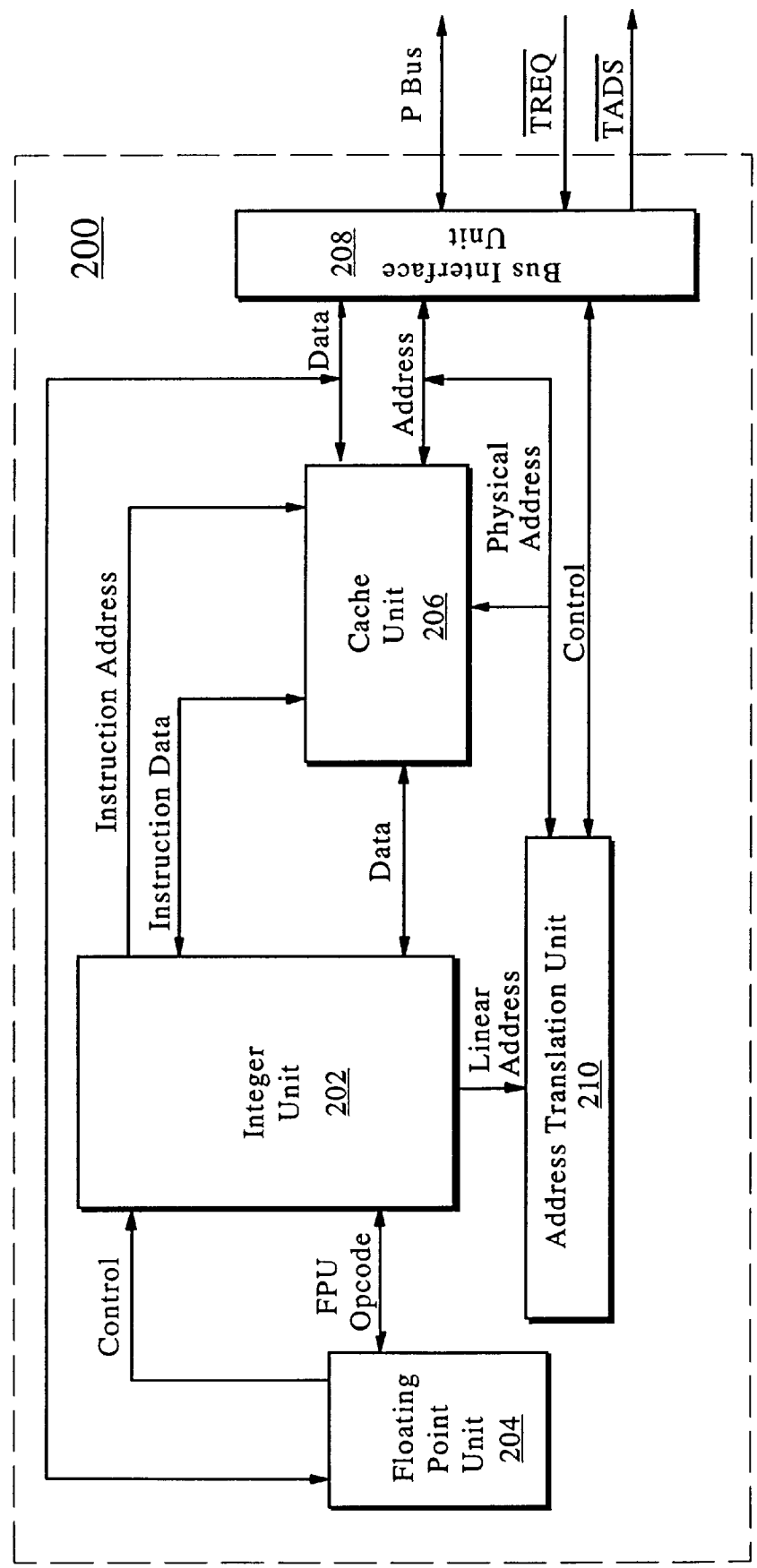
FIG. 4 is a simplified block diagram of an exemplary, but not exclusive processor depicted in FIG. 3.

Reference is now made to FIG. 4 which depicts a simplified block diagram of an exemplary, but not exclusive processor 200. Processor 200 includes an integer unit 202, a floating point unit 204, a cache unit 206, a bus interface unit 208, and an address translation unit 210, the details of each not being necessary for understanding the present invention. The integer unit 202 may, although not necessarily be superpipelined and/or superscalar. The cache unit 204 preferably, although not necessarily, includes a relatively small (primary) instruction cache and a relatively large unified cache for holding both instructions and data. The floating point unit 204 interfaces to the integer unit 202 and the cache unit 206 and performs floating point instructions in parallel with the integer unit 202 executing integer instructions. The bus interface unit 208 couples the processor to the external P Bus and as discussed in more detail hereinbelow, provides the signals and timing required by alternative bus masters and subservient peripherals on the P Bus.

Address translation unit 210 translates linear addresses into physical addresses supplied from either the integer unit 202 or as described in detail hereinbelow, addresses from an external bus master 300 through the bus interface unit 208. While a wide variety of choices for the address translation unit 210 (translation lookaside buffer) are contemplated for use with the present invention, the currently preferred embodiment is described in co-pending and commonly assigned patent applications Ser. No. 08/336,030 entitled "Address Translation Unit Employing A Victim TLB", now U.S. Pat. No. 5,752,274; issued May 12, 1998 and Ser. No. 08/336,148 entitled "Address Translation Unit Employing Programmable Page Size" attorney's docket No: CX00208, both filed on Nov., 08,1994, and both herein incorporated by reference.

It is to be further understood that Applicants contemplate "locking down" or partitioning (i.e. not flushing) portions of the Address Translation Unit 210 so that certain address ranges are always translated without tablewalks or page faults. An exemplary, although not exclusive teaching for such partitioning may be found in co-pending and commonly assigned patent application Ser. No. 08/464,921 entitled "Partitionable Cache", attorney's docket No: CX00233, filed on Jun., 05,1995, and herein incorporated by reference. An exemplary, although not exclusive application for a partitionable address translation unit 210 would be for a graphics address re-mapping table (a.k.a. GART) to support a 3D rendering processor.

Figure 5A:
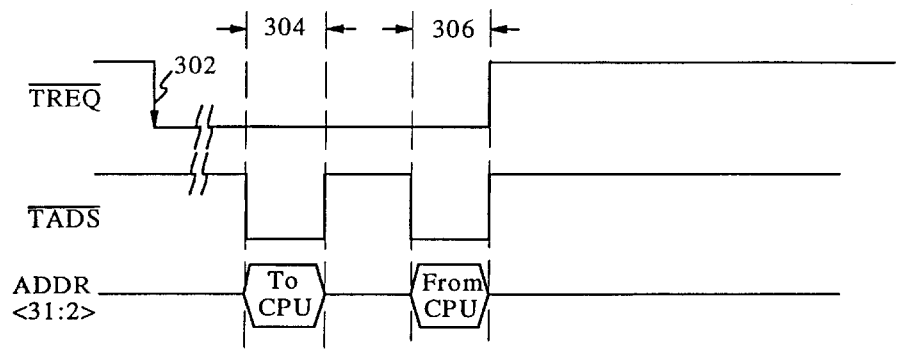
FIGS. 5a–5c are timing diagrams of signals generated by the system and processor depicted in FIGS. 3 and 4 respectively; and, FIG. 6 is a timing diagram of alternative signals generated by the system and processor depicted in FIGS. 3 and 4 respectively.
Figure 5B:
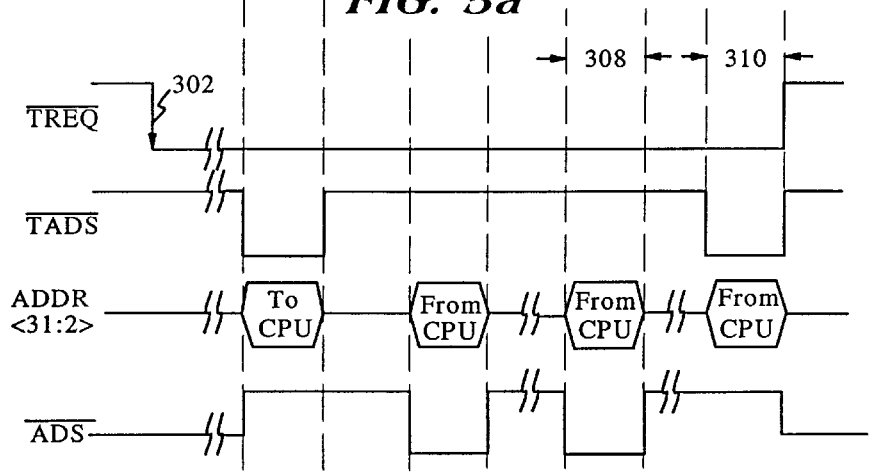
Figure 5C:
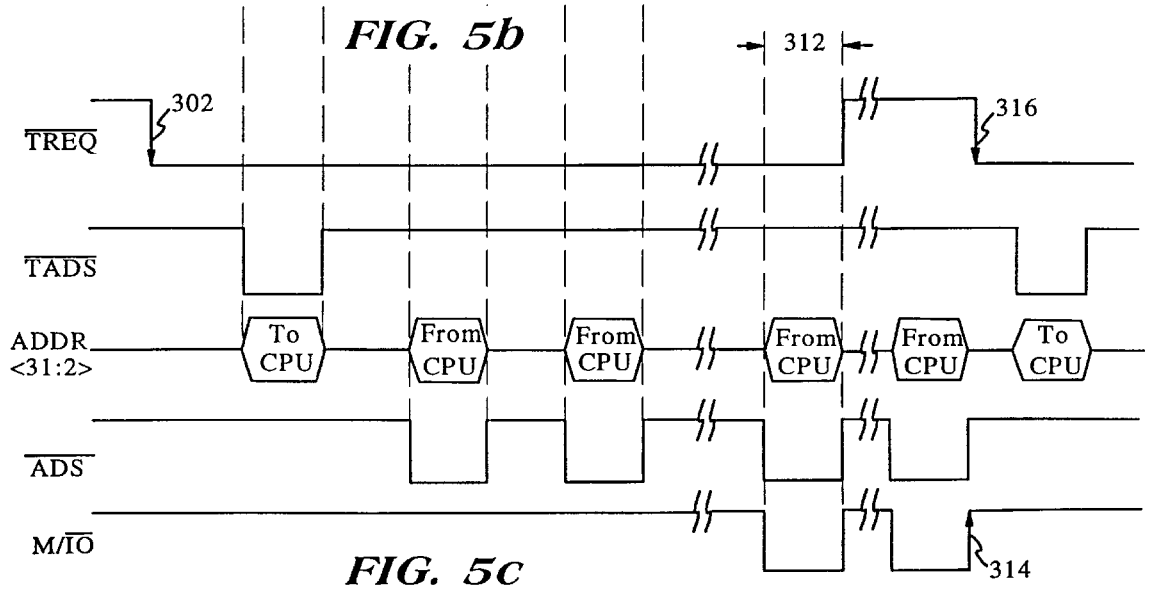
Figure 6:
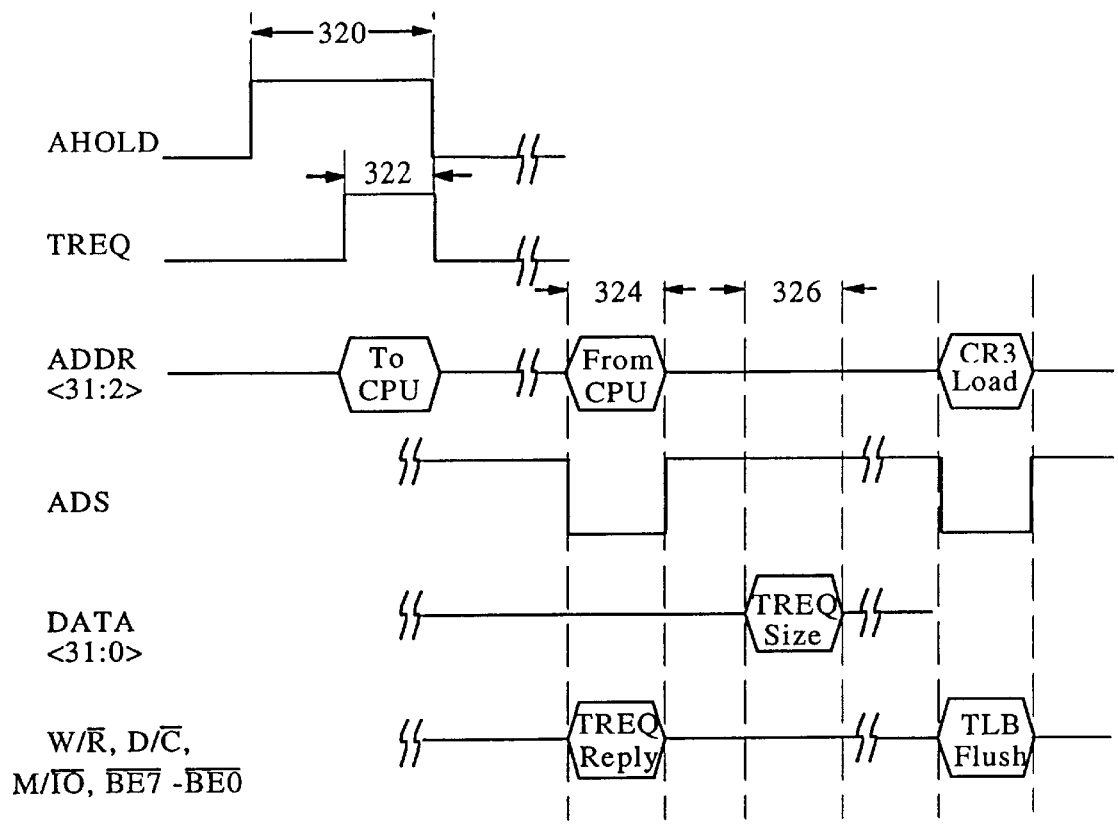

It should be further understood that with the aid of the present disclosure, those skilled in the art will recognize many forms of circuitry for the bus interface unit 208 to generate the signals depicted in FIGS. 5 and 6 without departing from the present disclosure.

3.0 First Preferred Embodiment For A Shared ATU Interface

Reference is now made to the timing diagrams depicted in FIGS. 5a–5c in conjunction with FIGS. 3–4, for explanation of the exemplary interface between processor 200 and the alternative bus master 300. For only one alternative bus master 300 (other than the processor 200), the first preferred embodiment teaches two new signals to the x86 architecture, one input and one output namely: translation request ($\overline{\text{TREQ}}$) and translation address strobe ($\overline{\text{TADS}}$).

As depicted in FIGS. 3 and 4, $\overline{\text{TREQ}}$ is an input from bus master 300 to processor 200 requesting processor 200 to read the address lines on the P Bus. $\overline{\text{TADS}}$ is a strobe asserted by processor 200 to bus master 300 acknowledging the request and identifying that processor 200 is accessing the address lines on the P Bus. Responsive to assertion of $\overline{\text{TADS}}$, bus master 300 maintains assertion of $\overline{\text{TREQ}}$ and drives the (virtual) address to be converted onto the address bus. As described in more detail hereinbelow, the processor 200 vis-à-vis address translation unit 210, translates the virtual address to its corresponding physical address (doing any required tablewalks or page fault routines) and drives the physical address out on the P Bus while asserting another $\overline{\text{TADS}}$. If a page fault occurs, the processor 200 communicates to bus master 300 to release its assertion of $\overline{\text{TREQ}}$ until the processor 200 performs a tablewalk to fulfill the address translation. After page fault recovery, the processor 200 communicates to the bus master 300 to reassert $\overline{\text{TREQ}}$ so that the translation may be completed.

3.1 Hit In The Address Translation Unit

Reference is now specifically made to FIG. 5a which depicts a timing diagram of signals for a hit (match) in the address translation unit 210 residing in the processor 200. In response to bus master 300 asserting $\overline{\text{TREQ}}$ low with falling edge 302, processor 200 drives $\overline{\text{TADS}}$ low—signaling the bus master 300 to drive the virtual address onto the P Bus during time interval 304. The bus master 300 maintains assertion of $\overline{\text{TREQ}}$ low until processor 200 reasserts $\overline{\text{TADS}}$ low, drives the translated (physical) address onto the P Bus, and de-asserts $\overline{\text{TADS}}$ high during time interval 306.

3.2 Tablewalk For Address Translation

Reference is now specifically made to FIG. 5b which depicts a timing diagram of signals for a miss in the address translation unit 210 residing in the processor 200 and a subsequent tablewalk for address translation. It is to be understood that while the READY ($\overline{\text{RDY}}$) signal is not shown, those skilled in the art would recognize with the aid of the present disclosure, the appropriate relationship with $\overline{\text{RDY}}$. In response to bus master 300 asserting $\overline{\text{TREQ}}$ low with falling edge 302, processor 200 drives $\overline{\text{TADS}}$ low—signaling the bus master 300 to drive the virtual address onto the P Bus during time interval 304. The bus master 300 maintains assertion of $\overline{\text{TREQ}}$ low while processor 200 performs a two step tablewalk by asserting the address lines on the P Bus to: fetch the DTE during time interval 306, fetch the PTE during time interval 308, and finally—to provide the translated address over the P Bus to bus master 300 during time interval 310. It should be noted that after the initial assertion of $\overline{\text{TADS}}$ low during time interval 304, $\overline{\text{TADS}}$ remains high until time interval 310 at which time processor 200 reasserts $\overline{\text{TADS}}$ low to signal the bus mater 300 that the translated address is on the P Bus. As is conventional with the x86 architecture, $\overline{\text{ADS}}$ is asserted low by processor 200 during time intervals 306 and 308 respectively, to indicate a valid addresses for the DTE and PTE respectively, during the tablewalk.

3.3 Page Fault For Address Translation

Reference is now specifically made to FIG. 5c which depicts a timing diagram of signals for a miss in the address translation unit 210 residing in the processor 200 and a subsequent tablewalk which indicates that the requested address (page) is not in memory (i.e. page fault). In response to bus master 300 asserting $\overline{\text{TREQ}}$ low with falling edge 302, processor 200 drives $\overline{\text{TADS}}$ low—signaling the bus master 300 to drive the virtual address onto the P Bus during time interval 304. The bus master 300 maintains assertion of $\overline{\text{TREQ}}$ low while processor 200 performs a two step tablewalk by asserting the address lines on P Bus to fetch the DTE during time interval 306 and to fetch the PTE during time interval 308. At the end of either time interval 306 or 308, processor 200 determines that the P (present) bit is not set in either the PTE or DTE respectively, indicating a page fault. Accordingly, the processor 200 executes a page fault recovery by trapping to a page fault handler (i.e. a software routine). The processor 200 indicates to the page fault handler that the requested address to be translated was external to the processor 200. The page fault handler then communicates to the bus master 300 requesting the translation to release $\overline{\text{TREQ}}$. The page fault handler then brings the missing page into memory and signals to the requesting bus master 300 to retry its address translation request as depicted in FIG. 5a.

4.0 Alternative Embodiments For Address Translation Unit Interface

Reference is now made to FIG. 6 which depicts a timing diagram of signals for a second preferred embodiment that employs the x86 architecture AHOLD input signal along with a new input signal $\overline{\text{TREQ}}$. While active high AHOLD is traditionally used for cache coherency support on processor 200, it is now employed (along with TREQ) to signal processor 200 that a bus master 300 is seeking an address translation. Accordingly, AHOLD is asserted high by bus master 300 during time interval 320 to cause processor 200 to tri-state the address lines of P Bus one clock after assertion of AHOLD while still completing the current bus cycle. During time interval 322, bus master 300 asserts TREQ high to indicate an external address translation request and drives the address to be translated onto the P Bus and into processor 200. During time interval 324, processor 200 drives the translated address onto the P Bus and also asserts a new encoding of preexisting signals (e.g. W/$\overline{\text{R}}$, D/$\overline{\text{C}}$, M/$\overline{\text{IO}}$, and $\overline{\text{BE7}}$–$\overline{\text{BE0}}$) to indicate to the bus master 300 the availability of the translated address. For example, the combination of signals W/$\overline{\text{R}}$=1, D/$\overline{\text{C}}$=0, and M/$\overline{\text{IO}}$=1 is currently unused and may be used to signal the availability of the translated address. As depicted in FIG. 6, the processor 200 may also supply the size of the address translation request on data bus lines <31:0> during time interval 326.

A third embodiment may employ the processor 200 signaling a page fault in response to a translation request (TREQ) from the bus master 300. A control pin (e.g. D/$\overline{\text{C}}$) may be asserted high on the $2^{nd}$ TADS strobe (indicating that the translated address is on the P Bus) if a hit occurs in the address translation unit 210 and asserted logically low if a page fault occurs. A bit stored in a control register and readable by the processor 200 is set to indicate that the page fault was due to an external translation request.

5.0 Conclusion

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A computer system comprising:
   (a) a bus;
   (b) a central processor having an internal address translation unit coupled to the bus, the bus being external to the central processor; and,
   (c) at least one bus master device external to the central processor coupled to the bus and having a translation request output coupled to the central processor to request translation of an address supplied by the at least one bus master device over the bus and to receive a translated address over the bus from the central processor.

2. A computer system as recited in claim 1 wherein the central processor further comprises a translation address strobe output coupled to the at least one bus master device, to strobe a virtual address into the central processor and a corresponding physical address out of the central processor.

3. A computer system as recited in claim 1 wherein the translation request output is a signal from a single pin on the at least one bus master device.

4. A computer system as recited in claim 1 wherein the translation request output is a new encoding of a plurality preexisting signals to the central processor.

5. A computer system as recited in claim 1 wherein if a page fault occurs, the central processor communicates to the at least one bus master device to release assertion of the translation request output until the central processor performs a page fault recovery.

6. A computer system as recited in claim 1 wherein the central processor further comprises a plurality of preexisting control pins encoded to signal a hit or a page fault resulting from a translation request.

7. A computer system as recited in claim 1 wherein the central processor further comprises a control register having a bit to indicate that a page fault was due to an external translation request.

8. A computer system as recited in claim 1 further comprising system memory coupled to the bus.

9. A computer system as recited in claim 8 wherein the system memory stores page tables for address translation.

10. A computer system as recited in claim 8 wherein the at least one bus master device is a graphics accelerator and the address translation unit performs graphics address re-mapping so that the graphics accelerator perceives a contiguous view of graphics data structures in dynamically allocated system memory.

11. A computer system comprising:
    (a) a bus;
    (b) a central processor including an address translation unit an d a bus interface unit coupled to the bus, the bus being external to the central processor; and,
    (c) at least one bus master device external to the central processor and having at least one output signal coupled to the bus interface unit to request translation of an address supplied by the at least one bus master device over the bus and to receive a translated address over the bus from the central processor.

12. A computer system as recited in claim 11 wherein the bus interface unit further includes at least one output signal coupled to the at least one bus master device to strobe addresses into and out of the central processor.

13. A computer system as recited in claim 12 wherein the at least one output signal is a single-use address strobe.

14. A computer system as recited in claim 12 wherein the at least one output signal is a plurality of encoded multiple-use signals.

15. A method of shared address translation comprising steps of:
  (a) asserting a signal from at least one bus master requesting an address translation;
  (b) supplying an address for translation from the at least one bus master over an external bus to a central processor having an internal address translation unit, the at least one bus master being external to the central processor; and,
  (c) returning a translated address to the at least one bus master from the central processor over the external bus.

16. A method as recited in claim 15 wherein step (c) comprises a step of returning a value from the internal address translation unit responsive to a match with the address supplied in step (b).

17. A method as recited in claim 15 wherein step (c) comprises a step of performing a table walk responsive to a miss with the address supplied in step (b).

18. A method as recited in claim 15 wherein if a page fault occurs, the method further comprises a step of communicating to the at least one bus master device to release assertion of the signal requesting an address translation until the central processor performs a tablewalk.

19. A method as recited in claim 15 further comprising a step of encoding a plurality of preexisting control pins to signal a hit or a page fault resulting from the address translation request.

20. A method as recited in claim 15 further comprising a step of setting a control bit in a control register to indicate that a page fault was due to an external translation request.

* * * * *